United States Patent Office 2,730,832
Patented Jan. 17, 1956

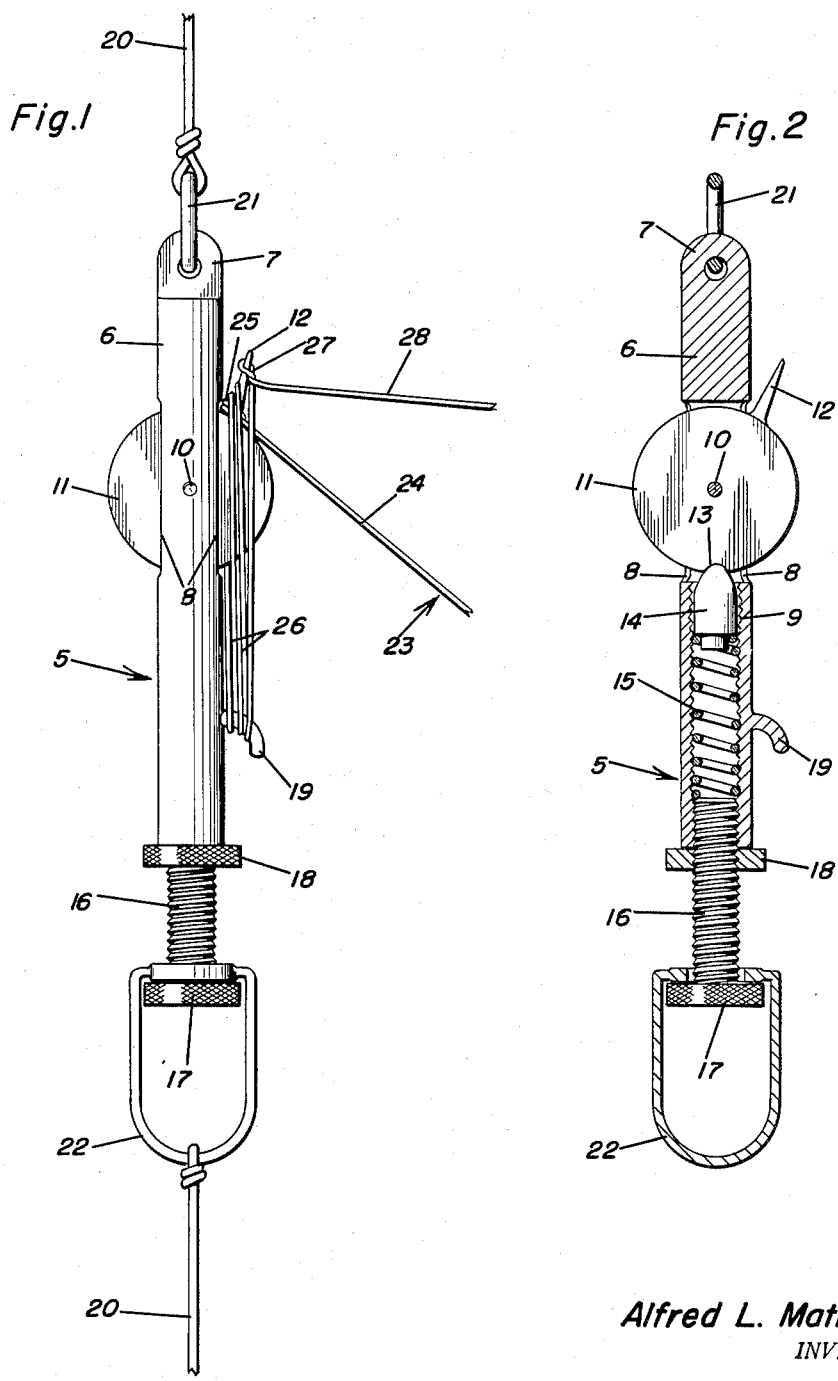

2,730,832
ADJUSTABLE OUTRIGGER FISHING SNAP
Alfred L. Mathers, Coral Gables, Fla.

Application December 4, 1953, Serial No. 396,099

3 Claims. (Cl. 43—43.11)

The present invention relates generally to new and useful improvements in deep sea fishing gear, comprising an outrigger, particularly for big game trolling and has for its primary object to provide, in a manner as hereinafter set forth, novel means for releasably anchoring the line at an intermediate point to the outrigger halyard.

Another very important object of the invention is to provide an outrigger fishing snap of the character described which may be expeditiously and accurately adjusted as desired to meet various conditions such, for instance, as the pull of large bait, rough water, etc.

Other objects of the invention are to provide an outrigger fishing snap of the character set forth which will be comparatively simple in construction, strong, durable, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of an outrigger snap constructed in accordance with the present invention.

Figure 2 is a view in vertical section through the device.

Referring now to the drawing in detail, it will be seen that the embodiment of the invention which has been illustrated comprises a metallic tube 5 of suitable length and diameter, said tube including a closed or solid upper end portion 6 having formed integrally therewith an upstanding apertured ear 7. At an intermediate point, the tube 5 has formed therein diametrically opposite longitudinal slots 8. The lower end portion of the tube 5 is internally threaded, as at 9.

Mounted in the slotted intermediate portion of the tube 5 is a pin or shaft 10. A metallic disk or wheel 11 is journaled on the shaft 10 and rotatable in the slots 8. Projecting from the periphery of the wheel 11 is a pin 12 the purpose of which will be presently set forth. At a point spaced from the pin 12, the wheel 11 is further provided with a peripheral recess or notch 13.

Slidably mounted in the lower portion of the tube 5 and engageable in the notch 13 is a keeper or detent 14. A coil spring 15 in the tube 5 yieldingly engages the detent 14 in the wheel notch 13. Threaded into the lower end portion of the tube 5 is an adjusting screw 16 for regulating the tension of the coil spring 15. The adjusting screw 16 comprises a knurled head 17 on its lower end. A knurled nut 18 is threaded on the screw 16 and engageable with the lower end of the tube 5 for locking said screw in an adjusted position. Projecting from the lower portion of the tube 5 is a downwardly directed hook 19 the purpose of which will also be presently set forth.

The tube 5 is adapted to be interposed in the outrigger halyard 20. Toward this end, a ring 21 is loosely mounted in the apertured ear 7, to which ring the upper portion of the halyard is tied. A swivel 22 is mounted on the adjusting screw 16 to which the lower portion of the halyard is tied.

It is thought that the manner in which the device is used will be readily apparent from a consideration of the foregoing. Briefly, with the spring loaded detent 14 engaged in the notch 13 the wheel 11 is releasably secured against rotation in the position shown to advantage in Figure 2 of the drawing. The line 23 from the reel, as at 24, is given a half hitch, as at 25, around the pin 12. The line is then looped in figure eights back and forth several times, as at 26 between the hook 19 and the pin 12. The line is then again half hitched as at 27 on the pin 12 and extends therefrom to the bait, as at 28. When a strike is had the tension of the coil spring 15 is overcome and the wheel 11 rotates clockwise as viewed in the drawing. It is to be noted that the spring-pressed slidable detent 14 and the notch 13 are formed with cooperating cam surfaces for releasably securing the wheel 11 against rotation until a strike is had. When this occurs the line is free to drop from the pin 12 and the hook 19. To vary the tension of the coil spring 15 to meet various conditions, the lock nut 18 is loosened and the adjusting screw 16 is turned into or out of the tube 5.

Although a preferred embodiment of the device is as illustrated and described, it is to be understood that changes in the details of construction may be resorted to which will fall within the scope of the invention as claimed.

What is claimed as new is as follows:

1. An outrigger fishing snap device of the character described comprising: a tube for interpositioning in an outrigger halyard, a hook on said tube, a wheel rotatable on the tube, a pin on said wheel, said pin and said hook being adapted to windingly receive an intermediate portion of a line for releasably securing said line to the tube, and means for releasably securing the wheel in operative position against rotation, said wheel having a peripheral notch therein, said means including a spring-pressed detent slidable in the tube and engageable in the notch said detent and said notch comprising cooperating cam surfaces.

2. An outrigger fishing snap device of the character described comprising: a tube for interpositioning in an outrigger halyard, a hook on said tube, a wheel journaled in the tube and protruding from diametrically opposite sides thereof, a peripheral pin on said wheel, said pin and said hook being adapted to windingly receive an intermediate portion of a line for releasably securing said line to the tube, said wheel having a peripheral notch therein at a point spaced from the pin, a detent slidable in the tube and engageable in the notch, said detent and said notch comprising cooperating cam surfaces, a coil spring in the tube engaging the detent in the notch for releasably securing the wheel in operative position against rotation, and a screw threadedly mounted in one end portion of the tube and engaged with the spring for regulating the tension thereof.

3. A fishing gear comprising, in combination, an outrigger halyard, a snap device including a tube interposed in the halyard, said tube having longitudinal slots therein, a wheel journaled in the tube and operable in the slots, a projection on the wheel, a projection on the tube, a fishing line having an intermediate portion wound around the projections and releasably anchored to the tube thereby, and a spring-biased detent slidable in the tube for releasably securing the wheel against rotation.

References Cited in the file of this patent

UNITED STATES PATENTS

| 71,615 | Hill | Dec. 3, 1867 |
| 384,853 | Keller | June 19, 1888 |
| 1,746,246 | Elworthy | Feb. 11, 1930 |
| 1,918,507 | Westling | July 18, 1933 |
| 2,087,828 | Wiedeman | July 20, 1937 |
| 2,156,467 | Walter | May 2, 1939 |
| 2,673,116 | Baird | Mar. 23, 1954 |